United States Patent
Lee

(10) Patent No.: US 7,792,000 B2
(45) Date of Patent: *Sep. 7, 2010

(54) METHOD OF GENERATING A DIGITAL PHOTO SLIDE SHOW FROM AN OPTICAL DISC

(75) Inventor: Hsieh-Te Lee, Taoyuan County (TW)

(73) Assignee: Cyberlink Corp., Hsin-Tien, Taipei Hsien (TW)

( * ) Notice: Subject to any disclaimer, the term of this patent is extended or adjusted under 35 U.S.C. 154(b) by 723 days.

This patent is subject to a terminal disclaimer.

(21) Appl. No.: 11/747,211

(22) Filed: May 10, 2007

(65) Prior Publication Data

US 2008/0232200 A1 Sep. 25, 2008

(30) Foreign Application Priority Data

Mar. 19, 2007 (TW) .............................. 96109395 A

(51) Int. Cl.
G11B 7/00 (2006.01)

(52) U.S. Cl. .................... 369/53.2; 369/30.03; 345/104

(58) Field of Classification Search .............. 369/30.19, 369/53.2, 30.03, 30.04, 30.05; 345/104; 707/10; 348/222.1, 540, 450, 586; 396/311; 386/126, 125

See application file for complete search history.

(56) References Cited

U.S. PATENT DOCUMENTS 7,145,597 B1 * 12/2006 Kinjo ...................... 348/222.1
2005/0147398 A1 * 7/2005 Anderson et al. ........... 386/125

* cited by examiner

*Primary Examiner*—Ali Neyzari
(74) *Attorney, Agent, or Firm*—Winston Hsu

(57) ABSTRACT

Before generating a digital photo slide show, both original digital photos and related media playing packages are burnt into a same optical disc. While the optical disc is loaded by a disc playing device, a media playing module installed on the optical disc playing device loads both the original digital photos and the related media packages on the optical disc, and generates a required digital photo slide show according to digital photos and media playing packages, both of which are chosen by a user, for preventing the problem of causing damage of resolution of the digital photos by repeatedly encoding said digital photos, and for management and reuse of said digital photos on the optical disc hereafter.

16 Claims, 2 Drawing Sheets

METHOD OF GENERATING A DIGITAL PHOTO SLIDE SHOW FROM AN OPTICAL DISC

BACKGROUND OF THE INVENTION

1. Field of the Invention

The present invention relates to a method of generating a digital photo slide show from an optical disc, and more particularly, to a method of generating a digital photo slide show from an optical disc without causing damage of the visual quality of the generated digital photo slide show.

2. Description of the Prior Art

After a large party suitable for being taped is held, such as a wedding, there are assistants for arranging videos taped during the party. The taped videos are then burnt into conventional digital versatile discs (DVD) for sharing the taped videos with people, who joined the party or did not join the party. For the conventional taped videos, digital photos are most popular means for sharing the taped videos with people who joined or did not join the party. Under a conventional circumstance, the assistants collect a plurality of digital photos taken during the party was held, and burn the plurality of digital photos on digital versatile discs for sharing with people who joined the party or did not join said party. However, there are problems in the conventional circumstance. For example, after the digital versatile discs, which are burnt with the digital photo slide show, are sent to people who joined or did not join the party, if there are updates on said digital photo slide show and related to digital photos taken on the party, where the updates may refer to increasing or decreasing digital photos in the original digital photo slide show, original digital photos, which have not been encoded into the original digital photo slide show, have to be retrieved first, and digital photos for updating are then added to the retrieved original digital photos for being encoded into an updated digital photo slide show. Moreover, when the updates refer to updating transition effects of the original digital photo slide show, the plurality of original digital photos has to be retrieved first also, then the updated digital photo slide show may thus be generated by adding the updated transition effects. The above-mentioned situations disadvantage the sharing and the management of the digital photos after said digital photos are burnt into digital versatile discs. Besides, before generating the digital photo slide show, the digital photos for generating said digital photo slide show have to be encoded first. However, compressions along with encoding the digital photos affect resolutions of said digital photos, and therefore, the visual quality of said digital photos is decreased. Repeated encoding affects the digital photos more severely while conventionally updating digital photos in a digital photo slide show and related transition effects. For solving the abovementioned problems, methods of burning the plurality of original digital photos along with the digital photo slide show are disclosed in the prior art, however, the disclosed methods result in occupying at least twice the amount of memory of the plurality of original digital photos on the digital versatile disc for storing all of the plurality of original digital photos, the digital photo slide show, and the related transition effects. Therefore, it is still extremely unbeneficial for the management and the sharing of the digital photos in the disclosed conventional methods because it may require providing at least two digital versatile discs for each one who joined the party or did not join the party for entirely sharing the digital photos related to the party.

SUMMARY OF THE INVENTION

The claimed invention discloses a method of generating digital photo slide show. The method comprises copying a plurality of digital photos and a plurality of digital media playing packages onto an optical disc, reading the plurality of digital photos and the plurality of digital media playing packages from the optical disc, and generating a digital photo slide show according to the plurality of digital media playing packages. The plurality of digital media playing packages comprises media special effects special effect packages and a playing module, both of which relate to the plurality of digital photos.

These and other objectives of the present invention will no doubt become obvious to those of ordinary skill in the art after reading the following detailed description of the preferred embodiment that is illustrated in the various figures and drawings.

DETAILED DESCRIPTION

Therefore, a method of generating a digital photo slide show from an optical disc without causing damage of the visual quality of the generated digital photo slide show is disclosed in the present invention for solving the abovementioned problems of the prior art.

Figure 1:
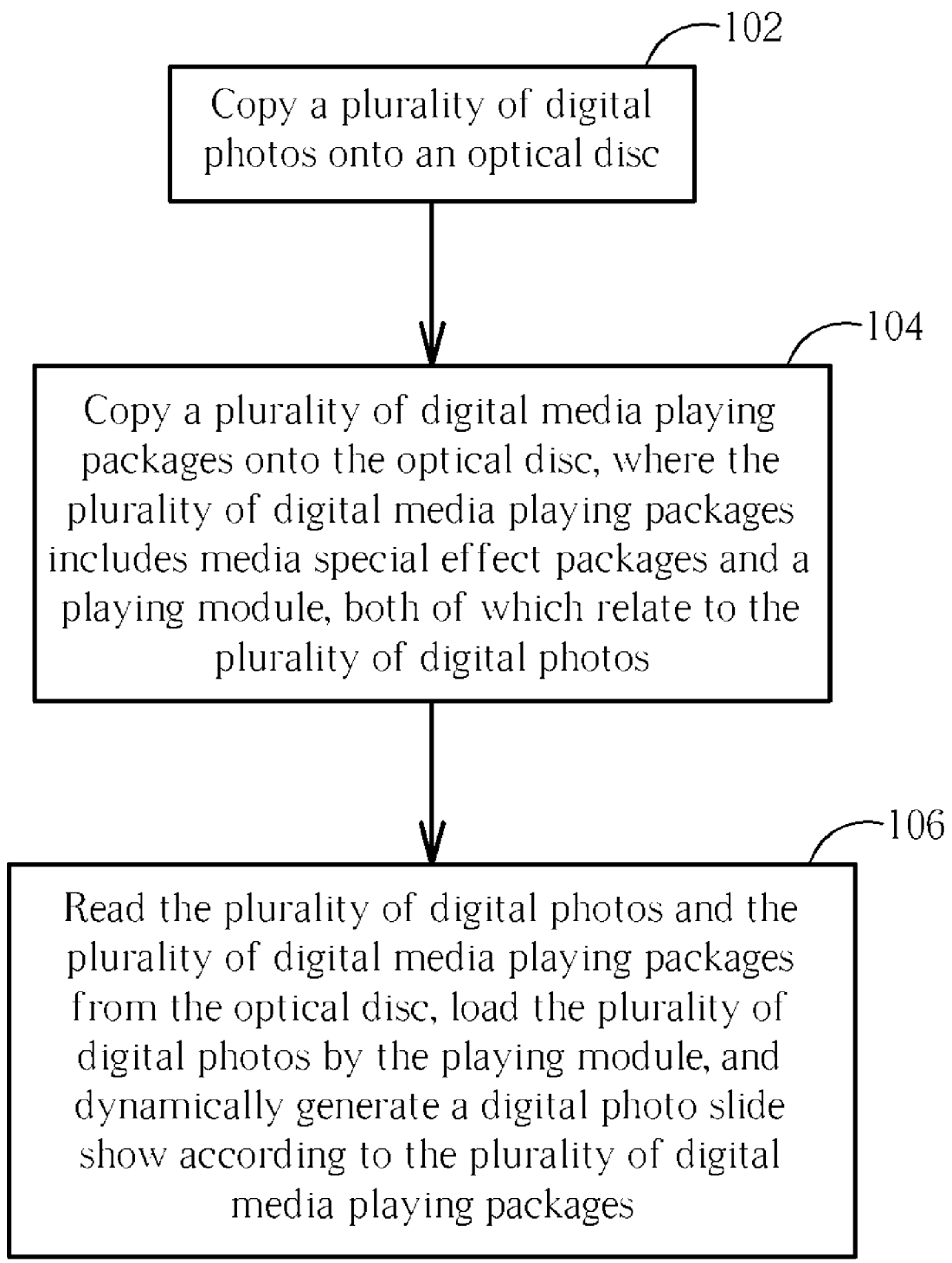
FIG. 1 is a flowchart of the method of generating a digital photo slide show from an optical disc in the present invention.

Please refer to FIG. 1, which is a flowchart of the method of generating a digital photo slide show from an optical disc in the present invention. The method illustrated in FIG. 1 includes steps as follows:

Step 102: Copy a plurality of digital photos onto an optical disc.

Step 104: Copy a plurality of digital media playing packages onto the optical disc, where the plurality of digital media playing packages includes media special effect packages and a playing module, both of which relate to the plurality of digital photos.

Step 106: Read the plurality of digital photos and the plurality of digital media playing packages from the optical disc, load the plurality of digital photos by the playing module, and dynamically generate a digital photo slide show according to the plurality of digital media playing packages.

Note that the optical disc mentioned in the steps illustrated in FIG. 1 may be a next generation optical disc, such as a Blu-ray disc and a high definition digital versatile disc (HD DVD). However, the method of the present invention may still be utilized on other kinds of optical discs, even on optical discs that have not been invented, and therefore, replacing the kind of utilized optical disc in the method of the present invention should not be limitations to the present invention.

Compared with the prior art, in Step 102, merely a plurality of original digital photos is stored into the optical disc whereas the digital photo slide show is not stored into said optical disc. Therefore, the memory for storing the digital photo slide show is saved, where the visual quality of the stored plurality of original digital photos is kept.

In Step 104, digital media playing packages are copied onto the optical disc along with the stored plurality of original digital photos, where the copied digital media playing packages include necessary packages such as transition effect packages, sound packages, background music packages, and a playing module. The playing module may be implemented with playing software, firmware, and hardware, and may include modules such as the Java Virtual Machine. When the optical disc is a next generation optical disc such as a Blu-ray disc or a high definition digital versatile disc (HD DVD), the digital media playing packages are written based on languages including Java Script and Markup language or based on packages including Java Xlets, and are burnt into the optical disc.

In Step 106, a disc playing device corresponding to the optical disc burnt with the plurality of original digital photos and related digital media playing packages is utilized. The plurality of original digital photos is loaded by the playing module, and is then utilized for dynamically generating a corresponding digital photo slide show according to the digital media playing packages copied in Step 104, where the generated digital photo slide show has special effect packages, which include digital media special effect packages such as fade-out packages. At last, the generated digital photo slide show is directly displayed by the optical disc playing device.

Figure 2:
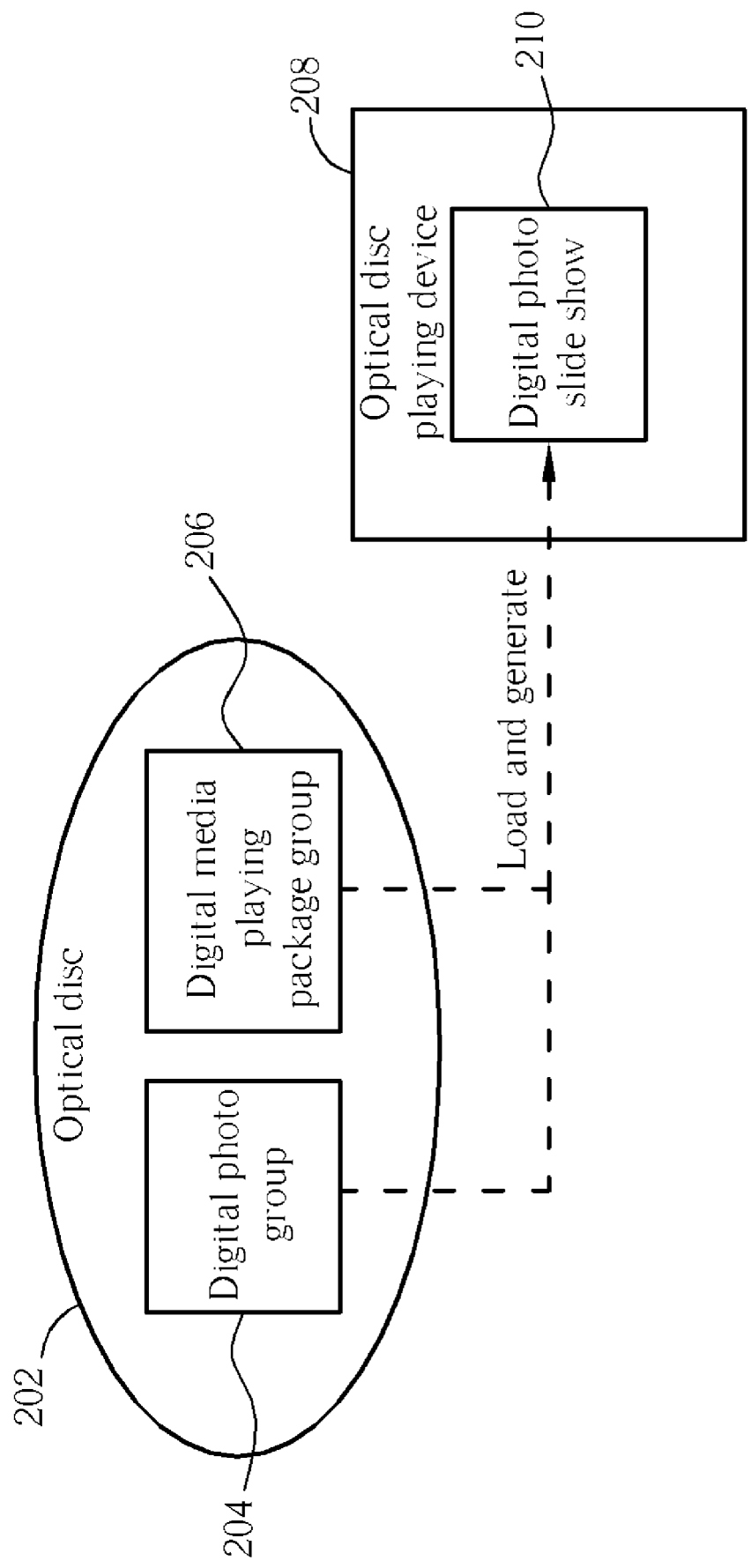
FIG. 2 is a block diagram illustrating how the optical disc playing device dynamically generates and displays the digital photo slide show in Step 106 shown in FIG. 1.

Please refer to FIG. 2, which is a block diagram illustrating how the optical disc playing device dynamically generates and displays the digital photo slide show in Step 106 shown in FIG. 1. As shown in FIG. 2, the optical disc 202 is burnt with the digital photo group 204 and the digital media playing package group 206. The digital photo group 204 includes a plurality of digital photos having their original visual qualities. The digital media playing package group 206 includes a plurality of media playing packages such as transition effect packages, sound effect packages, background music packages, and a playing module. After the optical disc 202 is loaded into the optical disc playing device 208, the optical disc playing device 208 loads both a required plurality of digital photos from the digital photo group 204 with a built-in media playing module, which may be implemented with software, firmware, or hardware, and a default corresponding plurality of digital media playing packages from the digital media playing package group 206. Therefore, the digital photo slide show 210 having special effects is dynamically generated under the environment provided by the optical playing device 208 and with the loaded plurality of digital media playing packages.

Associations between digital photos of the digital photo group 204 and digital media playing packages of the digital media playing package group 206 may be predetermined before both the digital photo group 204 and the digital media playing package group 206 are burnt into the optical disc 202, and related settings, such as transition effects, sound effects, background music, and the playing module, of the digital photo slide flow 210 may be burnt into the optical disc 202 also. Therefore, after both a plurality of digital photos from the digital photo group 204 and an associated plurality of digital media playing packages from the digital media playing package group 206 are loaded into the optical playing device 208, the digital photo slide show 210 having special effects may be generated according to digital media playing packages of the digital media playing package group 206. It indicates the fact that there must be fixed and predetermined associations between the digital photo group 204 and the digital media playing package group 206 for reducing memory occupied in the optical disc 202, and for dynamically generating the digital photo slide show 210 within the optical disc playing device 208.

Note that in a preferred embodiment of the present invention, the media playing module installed on the optical disc playing device 208 is driven by software, such as the Java Virtual machine, for executing and installing digital media playing packages, which are based on Java Xlets or Java Script, of the digital media playing package group 206. Moreover, digital media playing packages of the digital media playing package group 206 are generated by classifications of the application programming interface (API) of the Java language.

According to descriptions of both Step 106 and the block diagram illustrated in FIG. 2, the aim of dynamically generating a digital photo slide show without causing damage of the visual quality of original digital photos can be achieved in the present invention. The problem, which results from generating digital photo slide shows by repeatedly retrieving different original digital photos and is unbeneficial for the management and the sharing of the updated digital photos, of the prior art can thus be solved also. Moreover, the generated digital photo slide show is no longer necessary to be stored along with the original digital photos onto the optical disc so that said optical disc may be repeatedly used to generate updated and different digital photo slide shows.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating a digital photo slide show comprising:
   copying a plurality of digital photos and a plurality of digital media playing packages onto an optical disc, wherein the plurality of digital media playing packages comprises media special effect packages and a playing module, both of which relate to the plurality of digital photos; and
   reading the plurality of digital photos and the plurality of digital media playing packages from the optical disc, and generating a digital photo slide show according to the plurality of digital media playing packages.

2. The method of claim 1 wherein the plurality of digital media playing packages are media playing packages classified with the application programming interfaces (API) of the JAVA language.

3. The method of claim 1 wherein the optical disc is a Blu-ray disc.

4. The method of claim 1 wherein the optical disc is a high definition digital versatile disc (HD DVD).

5. The method of claim 1 wherein the media special effect packages of the plurality of digital media playing packages comprise transition effect packages for generating the digital photo slide show.

6. The method of claim 1 wherein the media special effect packages of the plurality of digital media playing packages comprise sound effect packages for generating the digital photo slide show.

7. The method of claim 1 wherein the media special effect packages of the plurality of digital media playing packages comprise background music packages for generating the digital photo slide show.

8. The method of claim 1 wherein the media special effect packages of the plurality of digital media playing packages comprise fade-out packages for generating the digital photo slide show.

9. The method of claim 1 wherein the playing module is implemented by playing software.

10. The method of claim 1 wherein the playing module is implemented by firmware.

11. The method of claim 1 wherein the playing module is implemented by hardware.

12. The method of claim 1 wherein the playing module is implemented by Java virtual machines.

13. The method of claim 1 wherein the plurality of digital media playing packages are written based on Java Xlets packages, and are burnt into the optical disc.

14. The method of claim 1 wherein the plurality of digital playing packages are written based on the Java Script language, and are burnt into the optical disc.

15. The method of claim 1 wherein the plurality of digital media playing packages are written based on the Markup Language, and are burnt into the optical disc.

16. The method of claim 1 wherein there are fixed and predetermined associations between the plurality of digital photos and the plurality of digital media playing packages.

* * * * *